April 2, 1968 A. F. HULVERSON 3,376,063
TRAILER CONSTRUCTION
Filed Aug. 18, 1966 2 Sheets-Sheet 1
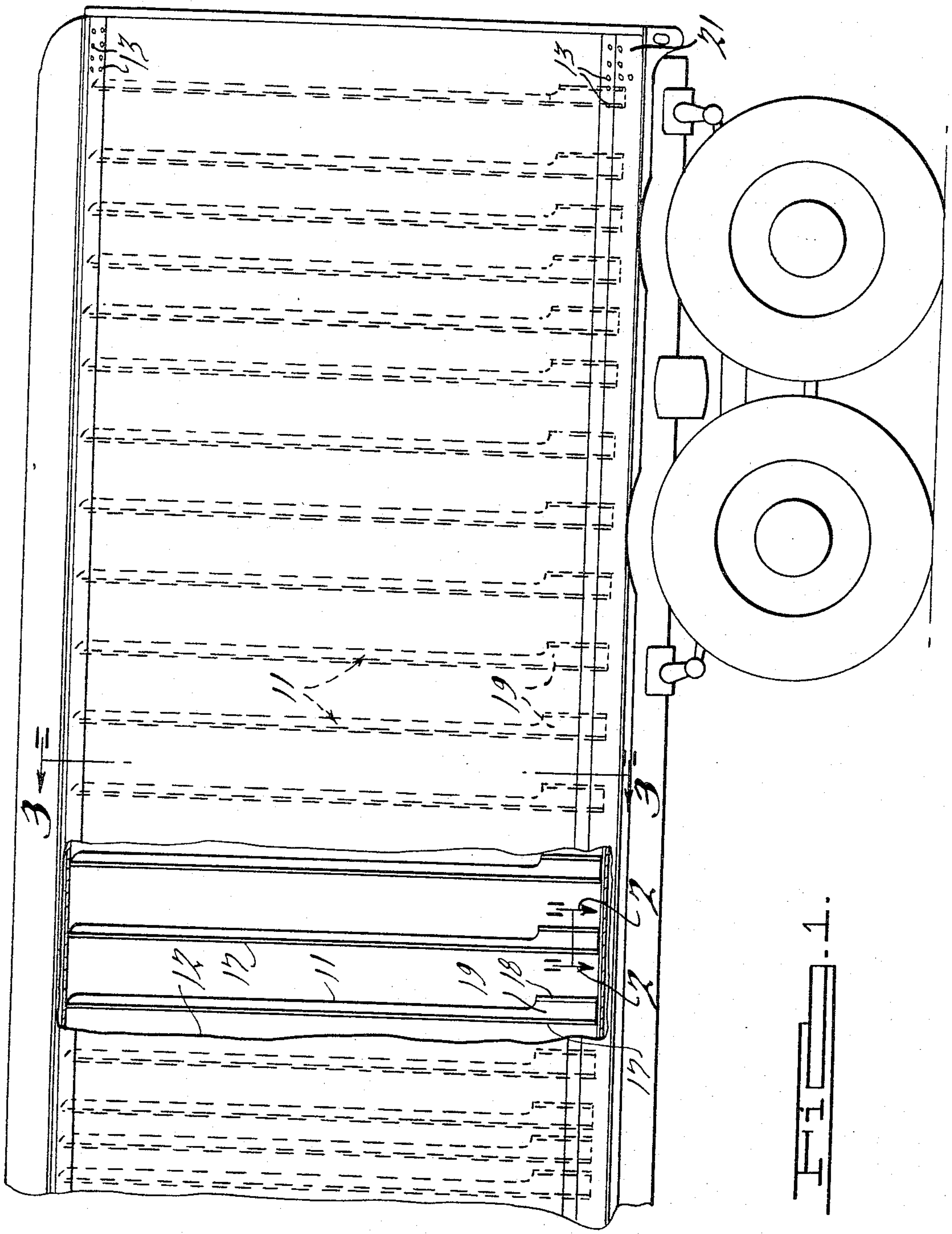
INVENTOR.
Adrian F. Hulverson
BY
Harness, Dickey & Pierce
ATTORNEYS.

April 2, 1968 A. F. HULVERSON 3,376,063
TRAILER CONSTRUCTION
Filed Aug. 18, 1966 2 Sheets-Sheet 2
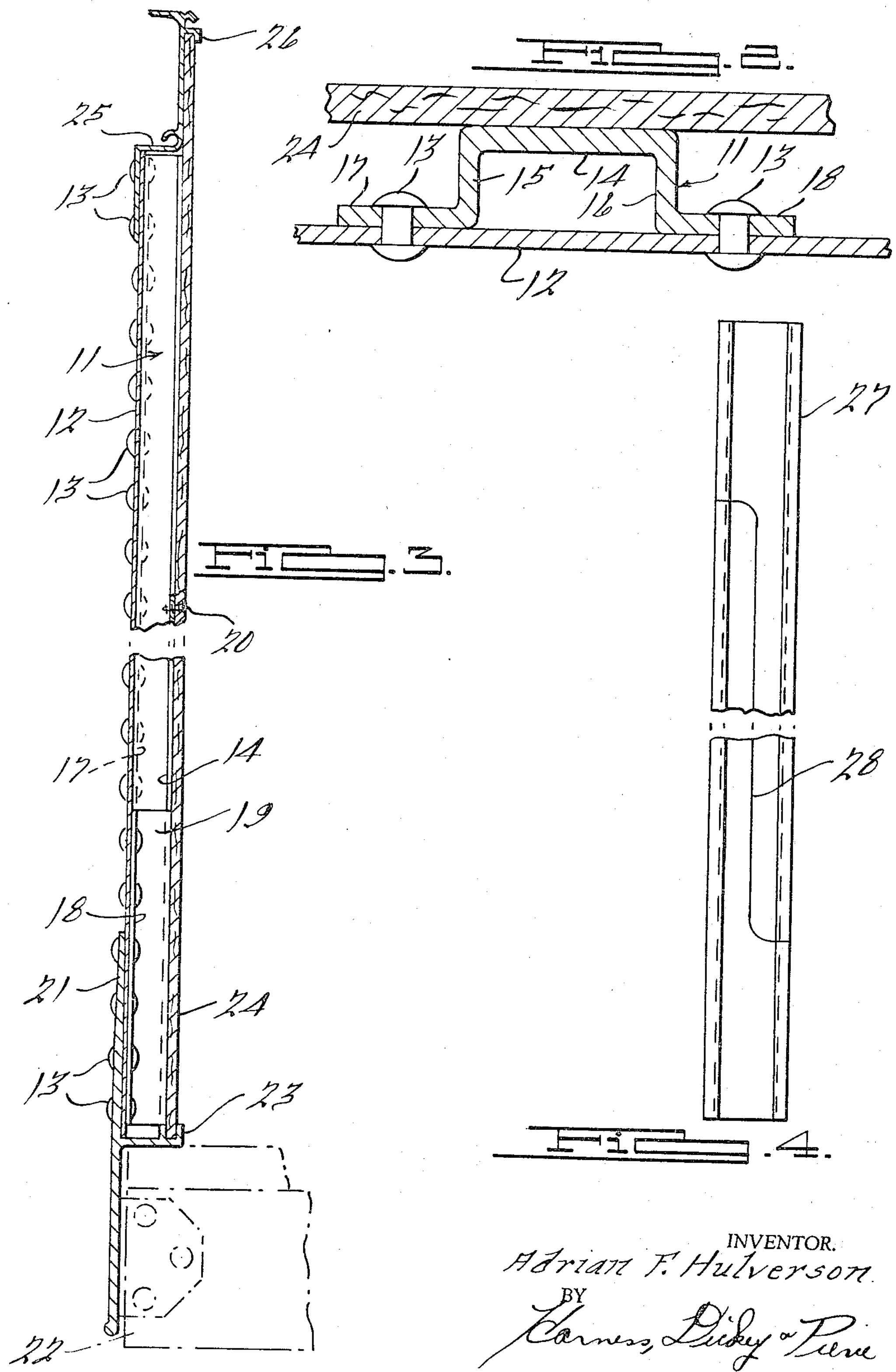
INVENTOR.
Adrian F. Hulverson
BY
Harness, Dickey & Pierce
ATTORNEYS.

United States Patent Office 3,376,063 Patented Apr. 2, 1968

3,376,063

TRAILER CONSTRUCTION

Adrian F. Hulverson, Grosse Pointe Woods, Mich., assignor to Fruehauf Corporation, Detroit, Mich., a corporation of Michigan Filed Aug. 18, 1966, Ser. No. 573,226
7 Claims. (Cl. 296—28)

This invention relates generally to trailer constructions, and more particularly to an improved construction for joining the outer skin panels and lower side rails of heavy duty trucks, trailers and the like.

Over-the-road trucks, trailers or the like are required to withstand severe vibratory and torsional forces that tend to weaken and ultimately separate the junctures between the structural components of the vehicle. Accordingly, there is a constant endeavor to improve the construction of such over-the-road vehicles so as to maximize the life and efficiency thereof consistent with manufacturing economy.

The present invention is directed to an improved means of joining the side wall panels of a heavy duty truck, trailer or the like, to complementary lower longitudinal side rails thereof. Practice of the present invention results in a relatively compact, inexpensive and rugged assembly that solves many of the problems incident to joining the structural members involved.

Accordingly, one object of the present invention is an improved construction for joining the side walls to the lower side rails of heavy duty trucks, trailers and the like.

Another object is an improved juncture construction for the side walls and lower rails of a trailer that effects the securing thereto of an inner wall liner.

A further object is an improved juncture construction for the side walls and lower rails of a trailer wherein the greatest structural strength is provided at the area of greatest stress.

Still another object is to provide for the aforesaid construction a vertical supporting and joining member of simple manufacture which furnishes the desired distribution of strength.

Other objects and advantages of the present invention will be apparent from the following specification, claims and drawings, wherein:

FIGURE 1 is a partially sectional view of the vertical members supporting the side walls of a trailer body;

FIG. 2 is a cross sectional view of the structure illustrated in FIGURE 1, taken on the line 2—2 thereof;

FIG. 3 is a cross sectional view of the structure illustrated in FIG. 1, taken on the line 3—3 thereof; and FIG. 4 is a side elevational view of the stock from which the vertical supporting members are manufactured.

Referring to FIGURE 1 of the drawings, a trailer construction in accordance with the present invention comprises a plurality of vertical members 11 to which the outer skin 12 is secured by rivets 13. As best seen in FIG. 2, the members 11 are of channel-shaped horizontal cross section defined by a bight portion 14, inwardly extending leg portions 15 and 16, and oppositely directed flange portions 17 and 18. The complete horizontal cross section of each member 11, as illustrated in FIG. 2, is present only for a short length at the bottom member and end 19, where both flange portions 17 and 18 engage the skin 12. The longer extension of each member 11 has half of the horizontal cross section illustrated in FIG. 2, so that only the flange portion 17 engages the skin 12 on the entire member length.

It will be noted from FIG. 3 that each vertical member 11 is secured by rivets 13 to a lower side rail 21 which is mounted lengthwise on a trailer bed 22, and which covers the lower portion of the outer skin 12. A U-shaped element 23 of the side rail 21 provides a seat for the lower edge of an inner wall panel 24 which engages the bight portion 14 of the member 11 on its entire length. An upper trailer side rail 25 is secured by rivets 13 to the outer skin 12 and to the top end of each vertical member 11. The upper side rail 25 has a projection 26 which engages the upper edge of the panel 24 so that the panel 24 is held upright and in engagement with the vertical members 11. Additional support may be furnished to the panel 24 by one or more screws securing the panel 24 to each member 11 as shown at 20 in FIG. 3. It will be appreciated that this construction provides the greatest structural strength at the bottom ends 19 of the vertical members 11, especially by using both flange portions 17 and 18 to furnish more contact points for the installation of rivets 13 in the area of greatest vibrational and tortional stress. Also, this construction provides a lightening in weight for the longer extensions of the vertical members 11 without sacrificing structural strength in the less heavily-abused upper portion of the trailer side walls.

As seen in FIG. 4, the vertical members 11 can be easily manfactured from metal stock 27, having a horizontal cross section as illustrated in FIG. 2. The stock is cut to the desired length and sheared at the proper interval on shear line 28, thus producing two vertical members 11 with a minimum of operations and stock wastage.

It is to be understood that the specific configuration of the improved trailer construction herein disclosed and described is presented for the purpose of explanation and illustration and is not intended to indicate the limits of the invention, the scope of which is defined by the following claims.

What is claimed is:

1. In a vertical supporting member for a vehicle wall, said member having a channel-shaped cross section on one end of its length and a fraction of said cross section throughout the remainder of its length.

2. In a vertical supporting member for a vehicle wall as recited in claim 1, fastening means being provided to comprising a bight, inwardly extending leg portions and oppositely-directed flange portions, and said fractional cross section comprising a fraction of the bight and all of one inwardly extending leg portion and one flange portion of said channel-shaped cross section.

3. In a vertical supporting member for a vehicle wall as recited in claim 2, a wall and said vertical supporting member being so disposed in relation thereto as to provide said wall with the greatest structural strength in the area of greatest anticipated stress to said wall, and to provide a corresponding lightening in the weight of said member in the area of least anticipated stress to said wall.

4. In a vertical supporting member for a vehicle wall as recited in claim 3, the distribution of strength and weight of said member being determined by the strength characteristics in the portion of said member having said channel-shaped cross section, and by the weight characteristics in the portion of said member having said fractional cross section.

5. In a vertical supporting member for a vehicle wall as recited in claim 1, fastening means being provided to attach said wall to said member along the one flange of the member portion having said fractional cross section and along both flanges of the member portion having said channel-shaped cross section.

6. In a vertical supporting member for a vehicle wall as recited in claim 2, means being provided for the manufacture of a pair of said members from one element having said channel-shaped cross section by separating said members along a common and complementary line of separation.

7. In a vertical supporting member for a vehicle wall as recited in claim 2, said member being so shaped as to join another member of like design along a complementary line of juncture and form thereby an element having a channel-shaped cross section throughout its length.

References Cited

UNITED STATES PATENTS

| | | | |
|---|---|---|---|
| 2,243,113 | 5/1941 | Mussey et al. | 105—409 |
| 2,993,728 | 7/1961 | Beran et al. | 296—28 |
| 3,216,758 | 11/1965 | Bohlen | 296—28 |

LEO FRIAGLIA, *Primary Examiner.*

L. D. MORRIS, *Assistant Examiner.*